(12) United States Patent
Okimoto et al.

(10) Patent No.: US 9,964,639 B2
(45) Date of Patent: May 8, 2018

(54) RADAR APPARATUS WITH HARMONIC ATTENUATOR

(71) Applicant: Furuno Electric Co., Ltd., Nishinomiya (JP)

(72) Inventors: Takuya Okimoto, Nishinomiya (JP); Yoshifumi Ohnishi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 284 days.

(21) Appl. No.: 14/443,062

(22) PCT Filed: Nov. 5, 2013

(86) PCT No.: PCT/JP2013/079822
§ 371 (c)(1),
(2) Date: May 14, 2015

(87) PCT Pub. No.: WO2014/077148
PCT Pub. Date: May 22, 2014

(65) Prior Publication Data
US 2015/0309170 A1    Oct. 29, 2015

(30) Foreign Application Priority Data

Nov. 15, 2012  (JP) .................................. 2012-251352

(51) Int. Cl.
*G01S 13/89* (2006.01)
*G01S 7/03* (2006.01)
(Continued)

(52) U.S. Cl.
CPC ................ *G01S 13/89* (2013.01); *G01S 7/02* (2013.01); *G01S 7/032* (2013.01); *G01S 7/285* (2013.01); *G01S 13/04* (2013.01); *G01S 13/582* (2013.01)

(58) Field of Classification Search
CPC . G01S 13/89; G01S 7/02; G01S 7/032; G01S 7/285; G01S 13/04; G01S 13/582
(Continued)

(56) References Cited

U.S. PATENT DOCUMENTS 4,074,214 A    2/1978  Aichholzer
7,671,785 B1 *  3/2010  Walker .................... G01S 7/024
                                          342/26 D
(Continued)

FOREIGN PATENT DOCUMENTS

EP    2420858 A1   2/2012
JP    S4725948 Y1  8/1972
(Continued)

OTHER PUBLICATIONS

Machine translation of specification of JP2012-195676, SPC Electronics Corp., Oct. 11, 2012.*
(Continued)

*Primary Examiner* — Frank J McGue
(74) *Attorney, Agent, or Firm* — Alleman Hall Creasman & Tuttle LLP

(57) ABSTRACT

A radar apparatus configured to prevent a harmonic generated by a limiter from being transmitted outside is provided. The radar apparatus includes a harmonic processor between a circulator and a limiter. The harmonic processor includes harmonic processing stubs, and a compensation stub. The harmonic processing stubs attenuate the harmonic which is generated when the limiter attenuates a transmission signal passed through the circulator. The compensation stub cancels a change of a susceptance caused by disposing the harmonic processing stubs.

4 Claims, 3 Drawing Sheets

(51) Int. Cl.
*G01S 7/285* (2006.01)
*G01S 7/02* (2006.01)
*G01S 13/04* (2006.01)
*G01S 13/58* (2006.01)

(58) Field of Classification Search
USPC .......................................................... 342/179
See application file for complete search history.

(56) References Cited

U.S. PATENT DOCUMENTS

| | | | | |
|---|---|---|---|---|
| 2012/0169431 | A1* | 7/2012 | Kuroda | H01P 1/2039 333/136 |
| 2015/0268328 | A1* | 9/2015 | Johnson | G01S 7/03 342/21 |

FOREIGN PATENT DOCUMENTS

| JP | S6149851 B2 | 10/1986 |
|---|---|---|
| JP | H04294621 A | 10/1992 |
| JP | 2008014874 A | 1/2008 |
| JP | 2009139274 A | 6/2009 |
| JP | 2009239574 A | 10/2009 |
| JP | 2009281868 A | 12/2009 |
| JP | 2010175333 A | 8/2010 |
| JP | 2012195676 A | 10/2012 |

OTHER PUBLICATIONS

Machine translation of specification of JP2009-239574, Toto Ltd., Oct. 15, 2009.*
Machine translation of specification of JP2009-281868, Exa Technologies Inc., Dec. 3, 2009.*
ISA Japanese Patent Office, International Search Report Issued in Application No. PCT/JP2013/079822, dated Jan. 28, 2014, WIPO, 4 pages.

* cited by examiner

RADAR APPARATUS WITH HARMONIC ATTENUATOR

TECHNICAL FIELD

This disclosure relates to a radar apparatus, which reduces a harmonic of a transmission signal generated by a limiter.

BACKGROUND ART

Conventionally, it is known that radar apparatuses detect target objects therearound by transmitting transmission signals to the outside, receiving reflection waves caused by the transmission signals, and analyzing the reflection waves with a reception system circuit. Such a radar apparatus is provided with a circulator and a limiter so as to prevent a transmission signal having high signal level from being inputted to the reception system circuit.

The circulator prevents the transmission signal from being inputted to the reception system circuit by switching the flow of the signal. The limiter can protect the reception system circuit even in a case where a transmission signal which could not be intercepted by the circulator is inputted to the reception system circuit, by attenuating the signal having the high signal level. Patent Document 1 and Patent Document 2 disclose arts relating to such a limiter.

A limiter circuit of Patent Document 1 includes a stub that short-circuits with a double wave and a triple wave (harmonic) of a basic frequency. The stub is provided to suppress variation of limit properties of the limiter.

A limiter circuit of Patent Document 2 attenuates a signal having a high signal level by a diode. An open stub that is a transmission line opening at its tip is disposed near the diode. The open stub is provided to adjust variation of junction capacitance value of the diode.

REFERENCE DOCUMENT(S) OF CONVENTIONAL ART

Patent Document(s)

Patent Document 1: JPH04-294621A
Patent Document 2: JPS61-049851B

DISCLOSURE OF THE INVENTION

Problems to be Solved by the Invention

As described above, with the radar apparatus, when a transmission signal which could not be intercepted by the circulator is inputted to the reception system circuit, the limiter attenuates this transmission signal. Here, a harmonic of the transmission signal is generated.

The generated harmonic is transmitted outside from a radar antenna. The harmonic has a different frequency from a basic signal. Therefore, it may be considered that the harmonic causes influence on other instruments. Thus, a configuration in which the harmonic is prevented from being transmitted has been desired.

Moreover, in Patent Documents 1 and 2, the limiter circuits with stubs are disclosed; however, the stubs are provided to improve the function of the limiters themselves, and not to solve the disadvantages.

This disclosure is made in view of the above situations, and mainly aims to provide a radar apparatus, which prevents a harmonic generated by a limiter from being transmitted outside.

SUMMARY AND EFFECTS OF THE INVENTION

Problems to be solved by the present disclosure are described above, and means for solving the problems and effects thereof will be described below.

According to an aspect of this disclosure, a radar apparatus having the following configuration is provided. Specifically, the radar apparatus includes a radar antenna, a transmission signal generating module, a circulator, a limiter, one or more filters, a reception signal amplifier and an image generating module. The radar antenna transmits a transmission signal outside and receives, as a reception signal, a reflection wave caused by the transmission signal. The transmission signal generating module generates the transmission signal. The circulator outputs the transmission signal to the radar antenna, and outputs the reception signal to a reception system circuit. The limiter is disposed in the reception system circuit and attenuates the signal according to a signal level of the reception signal. The one or more filters are disposed between the circulator and the limiter and attenuate a harmonic of the transmission signal propagating from the limiter to the radar antenna. The reception signal amplifier is disposed on a downstream side of the limiter in a propagating direction of the reception signal, and amplifies the reception signal. The image generating module generates a radar image based on the reception signal amplified by the reception signal amplifier.

Thus, even in a case where the transmission signal which could not be intercepted by the circulator is inputted to the reception system circuit and the harmonic is generated by the limiter, it can be prevented that the harmonic is transmitted outside from the radar antenna. Moreover, by disposing the filters between the circulator and the limiter, it can be prevented that the influence is given to the transmission signal to be transmitted outside.

With the radar apparatus, each of the one or more filters is preferably a stub configured to attenuate the harmonic by a transmission line in either one of a short-circuit state and an open state.

Thus, it can be prevented that the harmonic is transmitted outside, with a structure of low cost.

With the radar apparatus, at least one of the one or more stubs preferably has a short-circuited tip.

Thus, the one or more stubs can be caused to exert a DC return function, an inductor and the like can be omitted.

With the radar apparatus, the limiter and the one or more filters are preferably formed on the same substrate as each other.

Thus, a compact configuration can be achieved.

The radar apparatus is preferably mounted on a ship and preferably detects a target object around the ship.

Thus, a radar apparatus for ships, having a configuration in which the harmonic is difficult to be transmitted outside, can be achieved.

BRIEF DESCRIPTION OF DRAWING(S)

Figure 3A:
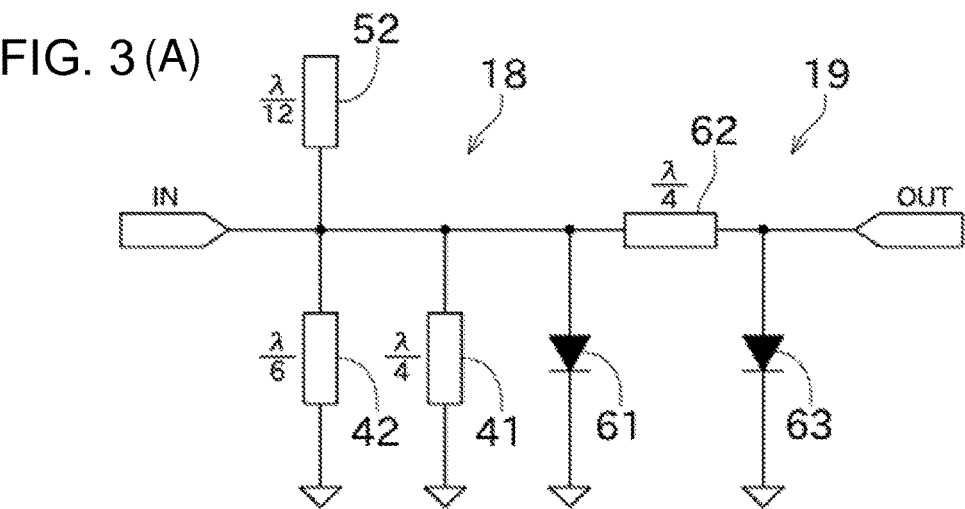
Figure 3B:
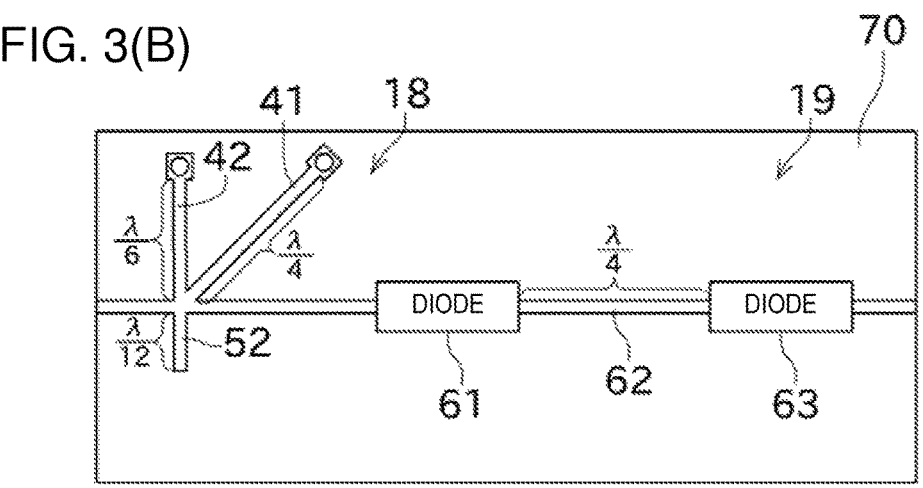

FIGS. 3(A) and 3(B) show a circuit diagram and a view illustrating configurations of the limiter and a harmonic processor, respectively.

Figure 4:
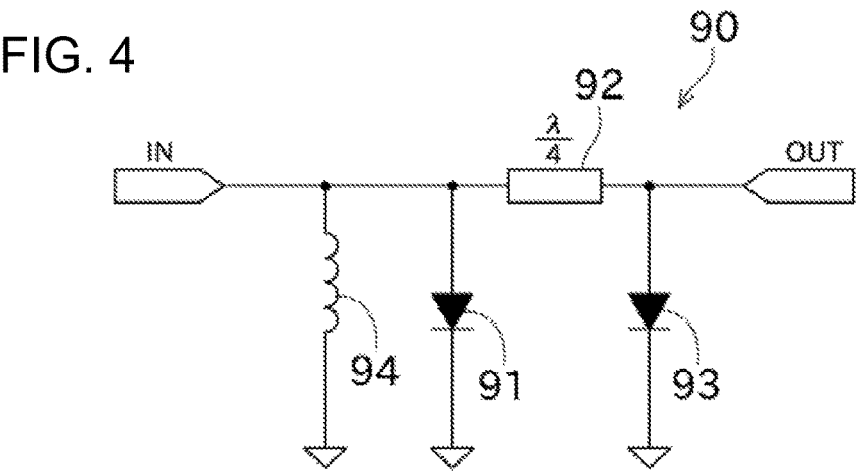

FIG. 4 is a circuit diagram illustrating a conventional limiter.

MODE(S) FOR CARRYING OUT THE INVENTION

Figure 1:
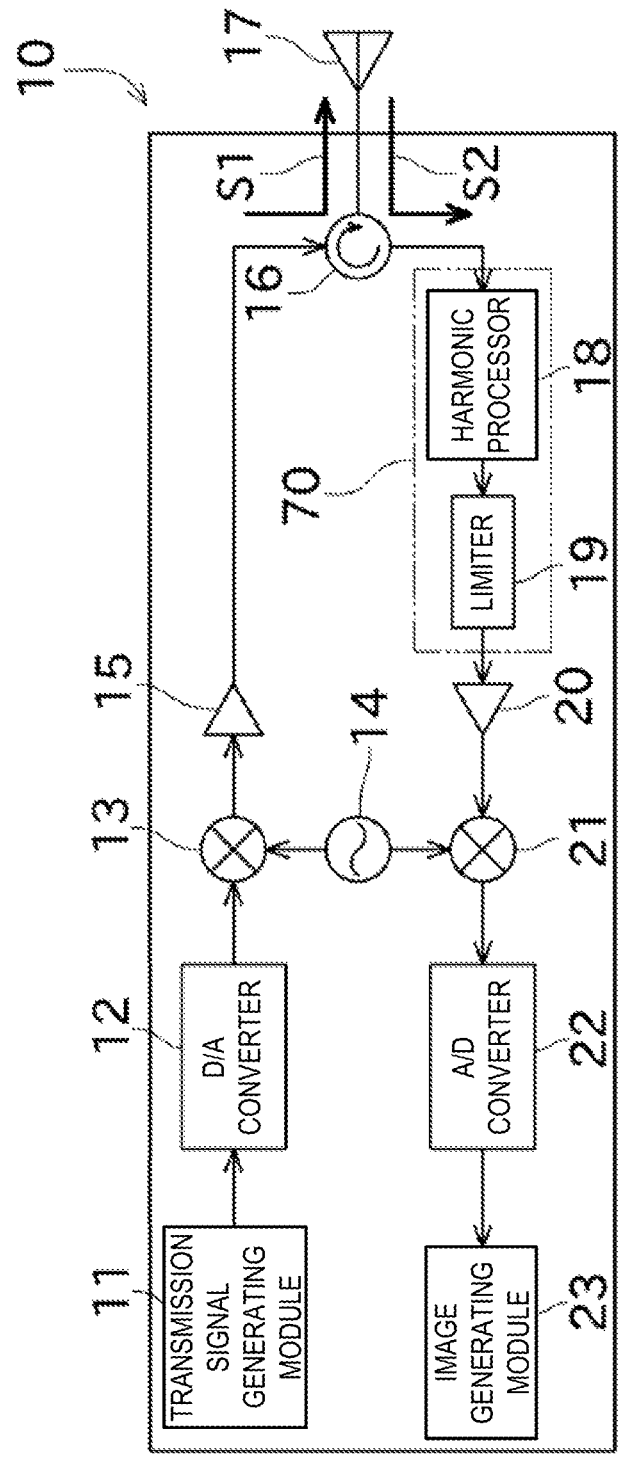
FIG. 1 is a block diagram illustrating a configuration of a radar apparatus according to one embodiment of this disclosure.

Next, an embodiment of this disclosure is described with reference to the drawings. FIG. 1 is a block diagram illustrating a configuration of a radar apparatus 10 according to one embodiment of this disclosure.

The radar apparatus 10 of this embodiment is a pulse compression radar apparatus of a type that is mounted on a ship. The radar apparatus 10 can detect a position and speed of a target object by transmitting outside a radio wave (transmission signal) having a short pulse length, and pulse-compressing and analyzing a reception signal that is a reflection wave caused by the radio wave. Note that, the radar apparatus 10 is not limited to the pulse compression radar apparatus, and may be configured to transmit outside a transmission signal having a long pulse length, generated by a magnetron, for example.

A transmission signal generating module 11, a D/A converter 12, a mixer 13, a local oscillator 14, and a transmission amplifier 15 are disposed in a transmission system circuit of the radar apparatus 10. Moreover, the radar apparatus 10 includes a circulator 16 and a radar antenna 17.

The transmission signal generating module 11 generates a transmission signal having a predetermined waveform (change of frequency over time). In this embodiment, the transmission signal generating module 11 generates a nonlinear transmission signal and outputs it to the D/A converter 12. The D/A converter 12 converts the transmission signal generated by the transmission signal generating module 11 from a digital signal into an analog signal, and outputs it to the mixer 13.

The local oscillator 14 includes an oscillator, and can output a local oscillation signal (local signal). The local signal is supplied to the mixer 13 and a mixer 21 described later.

The mixer 13 mixes the transmission signal inputted from the D/A converter 12, with the local signal outputted from the local oscillator 14. Thus, the frequency of the transmission signal can be raised to a transmission frequency. The mixer 13 outputs the transmission signal of which frequency is raised, to the transmission amplifier 15. The transmission amplifier 15 amplifies the transmission signal and transmits it outside from the radar antenna 17 via the circulator 16.

The radar antenna 17 is configured to transmit the transmission signal as described above, and receive a reflection wave caused by the transmission signal reflected on a target object (echo source) and returned, as the reception signal. Moreover, the radar antenna 17 is configured to repeatedly perform the transception of the radio wave, while rotating in the horizontal plane at a predetermined rotational speed. With the above configuration, the radar apparatus 17 can acquire a state of the target object therearound by scanning over 360° within the horizontal plane centering on the ship.

The circulator 16 is an electronic component configured to output the signal inputted to a predetermined port thereof, only from a predetermined different port. In transmitting the transmission signal, the circulator 16 outputs a transmission signal having a high energy (reference mark S1 in FIG. 1), which is transmitted from the transmission amplifier 15, to the radar antenna 17 (prevents it from being inputted to a reception system circuit). Moreover, the circulator 16 outputs the reception signal (reference mark S2 in FIG. 1) to the reception system circuit (prevents it from being inputted to a transmission system circuit).

Next, the reception system circuit of the radar apparatus 10 is described. Note that, in the description of the reception system circuit, the upstream side (downstream side) of a direction in which the reception signal is transmitted may simply be referred to as "upstream side (downstream side)."

The reception system circuit of the radar apparatus 10 includes a harmonic processor 18, a limiter 19, a reception amplifier 20, the mixer 21, an A/D converter 22, and an image generating module 23. Note that, the harmonic processor 18 and the limiter 19 are formed on the same substrate 70.

Figure 2:
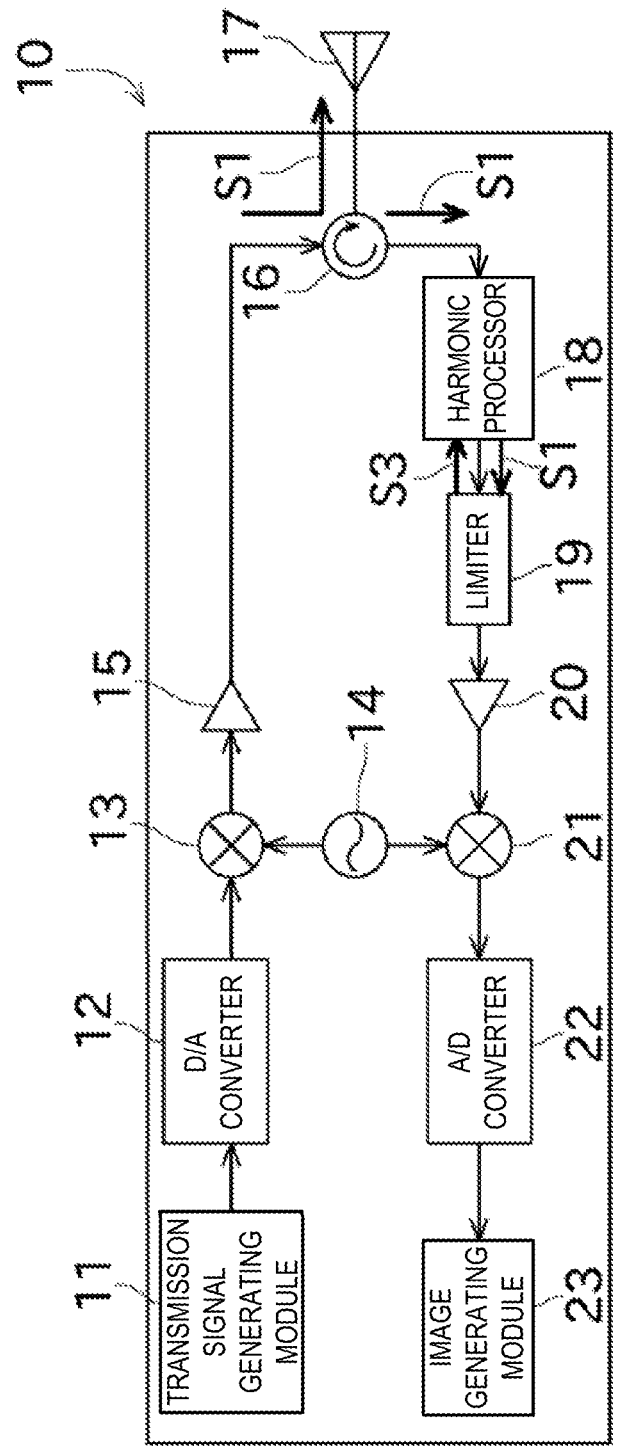
FIG. 2 is a block diagram illustrating a situation where a harmonic is generated by a limiter.

Although the circulator 16 functions to prevent the transmission signal from being inputted from the transmission system circuit to the reception system circuit as described above, in a case where the level of the transmission signal is extremely larger compared to the level of the reception signal, the transmission signal may leak from the circulator and pass therethrough, and be inputted to the reception system circuit (see FIG. 2).

The limiter 19 is provided to attenuate a signal having a larger signal level, such as the transmission signal. However, the limiter 19 attenuates the signal by clipping it, which causes generation of a harmonic of this signal (see reference mark S3).

This harmonic is outputted to the radar antenna 17. Here, since the frequency of the harmonic is a multiple integral of the frequency of the transmission signal, there is a possibility of overlapping with a frequency band used by other instruments. Therefore, it is not preferable for the harmonic to be transmitted outside. In this embodiment, the harmonic processor 18 is provided to attenuate this harmonic.

The harmonic processor 18 is disposed upstream (radar antenna 17 side) of the limiter 19 so as to attenuate the harmonic generated by the limiter 19. Moreover, the harmonic processor 18 is disposed downstream (limiter 19 side) of the circulator 16 so as not to attenuate the transmission signal to be transmitted outside. Note that, the specific configurations of the limiter 19 and the harmonic processor 18 are described later.

The reception amplifier (reception signal amplifier) 20 is comprised of an LNA (Low Noise Amplifier), for example. The reception amplifier 20 amplifies the signal level of the reception signal so that the instruments on the downstream side thereof can suitably perform signal processing. The amplified reception signal is outputted to the mixer 21 by the reception amplifier 20.

The mixer 21 can drop the frequency of the reception signal by mixing the reception signal with the local signal of the local oscillator 14, similar to the mixer 13. The mixer 21 outputs the reception signal of which frequency is dropped, to the A/D converter 22. The A/D converter 22 converts the reception signal of which frequency is dropped, from an analog signal into a digital signal.

The image generating module 23 performs pulse-compression on the reception signal inputted from the A/D converter 22, by taking the transmission signal and the like into consideration. The pulse-compression is processing of compressing (decoding) the reception signal based on the waveform of the transmission signal.

Moreover, the image generating module 23 generates a radar image based on a result obtained by compressing the reception signal. To describe in detail, the image generating module 23 obtains a distance to the target object, based on a time difference between a timing at which the radar antenna 17 transmits the transmission signal and a timing at which the reflection signal is received. Further, the image generating module 23 acquires an existing direction of the target object based on an orientation of the radar antenna 17 when the signal is detected. Thus, the image generating module 23 generates the radar image and displays it on a display unit that is not illustrated.

Next, the harmonic processor 18 and the limiter 19 are described in detail with reference to FIGS. 3(A) and 3(B). FIG. 3(A) is a circuit diagram of the limiter 19 and the harmonic processor 18, and FIG. 3(B) is a view illustrating a state where this circuit is formed on the substrate 70. Note that, in the following description, λ indicates a wavelength obtained based on a central frequency of a frequency band used by the radar apparatus 10.

First, the limiter 19 is described. As illustrated in FIGS. 3(A) and 3(B), the limiter 19 is comprised of a first diode 61 for large electric power, a second diode 63 for small electric power, and a connection part 62 configured to connect the first diode 61 to the second diode 63. Note that, the connection part 62 preferably has a length of λ/4 so as to improve efficiency of the limiter.

By this configuration, even in a case where the transmission signal is inputted through the circulator 16, the transmission signal is attenuated, and therefore, the reception system circuit can be protected. Note that, as described above, by attenuating the transmission signal with the limiter 19, the harmonic is generated.

Next, the harmonic processor 18 is described. As illustrated in FIGS. 3(A) and 3(B), the harmonic processor 18 includes harmonic processing stubs (filters) 41 and 42 that are transmission lines configured to process (attenuate) the harmonic, and a compensation stub 52 that is a transmission line configured to cancel a change of a susceptance caused by the harmonic processing stub 42.

Here, in FIGS. 3(A) and 3(B), although the length of each stub is illustrated, the length needs to be designed suitably. In other words, each of the lengths of the harmonic processing stubs 41 and 42 needs to be a length to suitably attenuate the harmonic, and the length of the compensation stub 52 needs to be a length to suitably cancel the change of the susceptance. Moreover, each length is also different depending on whether a tip of each stub is open (open state) or short-circuited (short-circuit state).

Hereinafter, the lengths of the respective stubs are described. Note that, in the description below, the followings are indicated.

$L_o$="the length of a harmonic processing stub of which tip is open"
$L_s$="the length of a harmonic processing stub of which tip is short-circuited"
$L_{ho}$="the length of a compensation stub of which tip is open"
$L_{hs}$"the length of a compensation stub of which tip is short-circuited"

As it is known conventionally, a susceptance $Y_o$ of a harmonic processing stub of which tip is open and a susceptance $Y_s$ of a harmonic processing stub of which tip is short-circuited, are expressed by the following equations.

$$Y_o = \frac{j\tan(\beta L_o)}{Z_0} \quad (1)$$

$$Y_s = \frac{j\tan(\beta L_s + \frac{\pi}{2})}{Z_0} \quad (2)$$

Here, β is a phase constant, and $Z_0$ is a characteristic impedance.

Moreover, a susceptance $Y_{ho}$ of a compensation stub of which tip is open and a susceptance $Y_{hs}$ of a compensation stub of which tip is short-circuited are expressed by the following equations, similar to the susceptances of the harmonic processing stubs.

$$Y_{ho} = \frac{j\tan(\beta L_{ho})}{Z_0} \quad (3)$$

$$Y_{hs} = \frac{j\tan(\beta L_{hs} + \frac{\pi}{2})}{Z_0} \quad (4)$$

Based on Equations 1 to 4, it can be understood that in order to make a sum of the susceptance of one of the harmonic processing stubs and the susceptance of one of the compensation stubs zero, it is required to only satisfy one of the following equations, according to combination of whether the tip is open or short-circuited.

$$\beta L_o + \beta L_{ho} = \pi \quad (5)$$
$$\beta L_o + \beta L_{hs} = \frac{\pi}{2}$$
$$\beta L_s + \beta L_{ho} = \frac{\pi}{2}$$
$$\beta L_s + \beta L_{hs} = 0$$

Moreover, the harmonic processing stubs need to satisfy the following equations to attenuate a harmonic of (m+1)th order, respectively.

$$L_o = \frac{1}{4(1+m)}\lambda \quad (6)$$

$$L_s = \frac{1}{2(1+m)}\lambda \quad (7)$$

Thus, for the length of the compensation stub with respect to the harmonic processing stub of which tip is open, it is required to only satisfy the following equations.

$$L_{ho} = \frac{1+2m}{4(1+m)}\lambda \quad (8)$$

$$L_{hs} = \frac{m}{4}\lambda \quad (9)$$

Moreover, for the length of the compensation stub with respect to the harmonic processing stub of which tip is short-circuited, it is required to only satisfy the following equations.

$$L_{ho} = \frac{m-1}{4(1+m)}\lambda \quad (10)$$

$$L_{hs} = \frac{m}{2(1+m)}\lambda \quad (11)$$

Thus, it can be understood that the harmonic processing stubs may be determined to satisfy either one of Equations 6 and 7 according to the order of the harmonic desired to be attenuated, and the compensation stub may be determined to satisfy one of Equations 8 to 11.

In this embodiment, the harmonic processing stub of which tip is short-circuited is used to remove a secondary harmonic. In other words, it can be understood that the length of the stub may be designed to be ¼λ by assigning m=1 to Equation 7. Moreover, the length of the compensation stub of which tip is open, which corresponds to the harmonic processing stub, becomes 0 by assigning m=1 to Equation 10. In other words, it can be understood that the compensation stub is not needed in this case.

Further, in this embodiment, the harmonic processing stub of which tip is short-circuited is used to remove a tertiary harmonic. In other words, it can be understood that the length of the stub may be designed to be ⅙λ by assigning m=2 to Equation 7. Moreover, the length of the compensation stub of which tip is open, which corresponds to the harmonic processing stub, becomes ¹⁄₁₂λ by assigning m=2 to Equation 10.

By determining the lengths of the harmonic processing stubs and the compensation stubs as above, the influence on the susceptances can be eliminated while removing the harmonics. Note that, although the harmonic processing stubs of which tips are short-circuited are used in this embodiment, as long as the above equations are satisfied, the harmonic processing stubs of which tips are open may alternatively be used. Moreover, instead of the compensation stub of which tip is open, the compensation stub of which tip is short-circuited may also be used.

In FIG. 3(B), the example in which the harmonic processor 18 and the limiter 19 are formed on the substrate 70 is described. As illustrated in FIG. 3(B), a configuration can be adopted, in which the stub for the secondary harmonic and the stub for the tertiary harmonic are formed from a single point on the substrate 70. Note that, each of the stubs is not limited to have a linear shape, and may be bent or curved according to the shape of the substrate 70, other circuits, etc.

Here, in FIG. 4, a conventional limiter 90 is illustrated. Similar to this embodiment, the limiter 90 includes a first diode 91, a connection part 92, and a second diode 93. Moreover, the limiter 90 includes an inductor 94. The inductor 94 can exert a function to short-circuit a direct current (DC return function).

On the other hand, in the limiter 19 of this embodiment, since the harmonic processing stubs 41 and 42 are short-circuited, the harmonic processing stubs 41 and 42 have the DC return function. Therefore, with the limiter 19 of this embodiment, the inductor 94 for DC return can be omitted.

As described above, the radar apparatus 10 of this embodiment includes the radar antenna 17, the transmission signal generating module 11, the circulator 16, the limiter 19, the harmonic processing stubs 41 and 42, the reception amplifier 20, and the image generating module 23. The radar antenna 17 transmits the transmission signal outside, and receives a reflection wave caused thereby, as a reception signal. The transmission signal generating module 11 generates the transmission signal. The circulator 16 outputs the transmission signal to the radar antenna 17, and outputs the reception signal to the reception system circuit. The limiter 19 is disposed in the reception system circuit, and attenuates the signal according to the signal level of the reception signal. Each of the harmonic processing stubs 41 and 42 is disposed between the circulator 16 and the limiter 19, and attenuates the harmonic of the transmission signal propagating from the limiter 19 to the radar antenna 17. The reception amplifier 20 is disposed on the downstream side of the limiter 19 in the transmission direction of the reception signal, and amplifies the reception signal. The image generating module 23 generates the radar image based on the reception signal amplified by the reception amplifier 20.

Thus, even in a case where the transmission signal which could not be intercepted by the circulator 16 is inputted to the reception system circuit and the harmonic is generated by the limiter 19, it can be prevented that the harmonic is transmitted outside from the radar antenna 17. Moreover, by disposing the harmonic processing stubs 41 and 42 between the circulator 16 and the limiter 19, it can be prevented that the influence is given to the transmission signal to be transmitted outside.

Although the preferred embodiment of this disclosure is described above, the above configuration can be modified as follows, for example.

In the above embodiment, the configuration in which the harmonic is attenuated by the harmonic processing stubs 41 and 42 is adopted; however, a configuration in which the harmonic is attenuated by a component other than the stubs may be adopted. For example, the harmonic may be attenuated by using (a low pass filter) configured to only allow the passing of a predetermined frequency band.

The harmonic processor 18 of this embodiment attenuates the secondary and tertiary harmonics; however, a configuration in which only one of the secondary and tertiary harmonics is attenuated may be adopted, or a configuration in which a larger number of harmonics are attenuated may be adopted.

This disclosure is not limited to the radar apparatus for ships, and it is also applicable to radar apparatuses to be mounted on other movable bodies, such as aircrafts. Moreover, other than the application of being mounted on movable bodies, this disclosure may be applied to radar apparatuses for monitoring navigation course.

DESCRIPTION OF REFERENCE NUMERAL(S)

10 Radar Apparatus
11 Transmission Signal Generating Module
12 D/A Converter
13 Mixer
14 Local Oscillator
15 Transmission Amplifier
16 Circulator
17 Radar Antenna
18 Harmonic Processor
19 Limiter
20 Reception Amplifier (Reception Signal Amplifier)
21 Mixer
22 A/D Converter
23 Image Generating Module
41, 42 Harmonic Processing Stub (Filter)
52 Compensation Stub

What is claimed is:
1. A radar apparatus, comprising:
a radar antenna configured to transmit a transmission signal at a target object and receive, as a reception signal, a reflection wave caused by a reflection of the transmission signal off the target object;
a transmission signal generator configured to generate the transmission signal;
a circulator configured to output the transmission signal to the radar antenna, and output the reception signal to a reception system circuit;

a limiter disposed in the reception system circuit and configured to attenuate the signal based on a signal level of the reception signal;

two or more stubs disposed between the circulator and the limiter and configured to attenuate a harmonic of the transmission signal propagating from the limiter to the radar antenna by a transmission line;

a compensation stub that is the transmission line configured to cancel a change in susceptance caused by the two or more stubs;

a reception signal amplifier disposed on a downstream side of the limiter in a propagating direction of the reception signal, and configured to amplify the reception signal; and an image generator configured to generate a radar image based on the reception signal amplified by the reception signal amplifier, wherein at least one of the two or more stubs has a short-circuited tip; and at least one of the two or more stubs has an open-circuited tip.

2. The radar apparatus of claim 1, wherein the limiter and the one or more filters are formed on a shared substrate.

3. The radar apparatus of claim 1, wherein the radar apparatus is installed in a ship and detects the target object in a vicinity of the ship.

4. A radar apparatus, comprising:

a radar antenna configured to transmit a transmission signal at a target object and receive, as a reception signal, a reflection wave caused by a reflection of the transmission signal off the target object;

a transmission signal generator configured to generate the transmission signal;

a circulator configured to output the transmission signal to the radar antenna, and output the reception signal to a reception system circuit;

a limiter disposed in the reception system circuit and configured to attenuate the signal based on a signal level of the reception signal;

two or more stubs disposed between the circulator and the limiter and configured to attenuate a harmonic of the transmission signal propagating from the limiter to the radar antenna by a transmission line;

a compensation stub that is the transmission line configured to cancel a change in susceptance caused by the two or more stubs;

a reception signal amplifier disposed on a downstream side of the limiter in a propagating direction of the reception signal, and configured to amplify the reception signal; and an image generator configured to generate a radar image based on the reception signal amplified by the reception signal amplifier, wherein at least two of the two or more stubs each have an open-circuited tip.

* * * * *